United States Patent [19]

Droux et al.

[11] 4,295,871
[45] Oct. 20, 1981

[54] SIZING COMPOSITION AND GLASS FIBERS TREATED WITH THE AID OF SUCH COMPOSITION

[75] Inventors: Michel Droux, La Ravoire; Gilbert Bocquet, Challes les Eaux, both of France

[73] Assignee: Saint-Gobain Industries, Paris, France

[21] Appl. No.: 26,430

[22] Filed: Apr. 2, 1979

[30] Foreign Application Priority Data

Apr. 3, 1978 [FR] France ............................. 78 09726

[51] Int. Cl.$^3$ .............................................. C03C 25/02
[52] U.S. Cl. ............................ 65/3.41; 260/29.4 UA; 260/29.6 NR; 427/175; 427/178; 427/387; 428/378
[58] Field of Search ............... 260/29.4 UA, 29.6 NR; 65/3 C; 427/175, 385 A, 178; 428/378

[56] References Cited

U.S. PATENT DOCUMENTS

| 3,116,192 | 12/1963 | Eilerman | 65/3 C |
| 3,168,389 | 2/1965 | Eilerman | 65/3 C |

FOREIGN PATENT DOCUMENTS

| 1490767 | 6/1967 | France . |
| 2186440 | 1/1974 | France . |
| 683 | 2/1979 | France . |
| 802549 | 10/1958 | United Kingdom . |
| 919318 | 2/1963 | United Kingdom . |

Primary Examiner—Theodore E. Pertilla
Attorney, Agent, or Firm—John T. Synnestvedt; John S. Child, Jr.

[57] ABSTRACT

Sizing compositions comprising a combination of several adhesive agents capable of being cross-linked, an acrylic polymer and a coupling agent, are used to treat glass fibers in order to provide improved plastic reinforcing fibers especially suited to use in sheet molding compounds whereby molded articles, particularly large pieces formed therefrom, will have improved reinforcement and surface characteristics.

1 Claim, No Drawings

SIZING COMPOSITION AND GLASS FIBERS TREATED WITH THE AID OF SUCH COMPOSITION

BACKGROUND OF THE INVENTION

The present invention concerns the preparation of glass fibers utilized for the reinforcement of plastic materials. In particular, it relates to a new sizing composition for coating glass fibers during their formation in the form of continuous filaments from molten glass or just after and also relates to the glass fibers coated with such composition.

More particularly, the invention deals with the preparation of glass fibers utilized for the reinforcement of sheets of molding composition. Such sheets are also known as Sheet Molding Compound (hereinafter referred to as SMC) from which products of reinforced plastic material are manufactured by means of heat and pressure.

The manufacture of articles of plastic material reinforced by glass fibers from SMC is increasing largely due to the low cost of this process in relation to other molding processes.

In the use of SMC, one or more flans cut out of a composite sheet of resin and cut glass fibers are placed on a mold in a press, and through heat and pressure the article is formed. Generally, there is utilized a flan whose surface corresponds to about 60% of that of the surface of the article to be molded, owing to the fact that the plastic material containing the glass fiber must flow in all directions in order to perfectly match the shape of the mold, in order to obtain a homogeneously molded product without mechanically weak points. Even more important than good mechanical properties, the article thus manufactured, generally sold as a raw molding, must have a faultless surface appearance which can be defined, on one hand, by the absence of visible fibers on the surface of the molded article, and on the other hand, by the absence of defects in the flatness of the surface, such as pinholes, craters, and flow waves.

The term "flow" will be utilized hereafter in order to designate the displacement of the plastic material during molding as well as the displacement of fibers or strands of cut glass, generally about 25 or 50 millimeters long.

The mechanical characteristics and the surface appearance of the reinforced plastics obtained in particular from SMC depend essentially upon specific qualities of the glass fiber utilized for reinforcement. However, the qualities are given to the glass fiber by its coating, therefore, generally through the sizing composition which is applied to it when it is in the form of continuous filaments, during its manufacture.

The treatment that the glass fibers utilized for reinforcement in SMC undergo during their manufacture when in the form of continuous filaments must therefore make them suitable for the reinforcement of plastics in general. That is to say, that it must not only join the filaments of the same strand, cover them with a thin lubricating layer in order to protect the filaments from mutual abrasion between them, and conserve the integrity of the strand during the winding and cutting operations, but also promote the binding between the glass and the synthetic resin in the composite.

The treatment must also give the strand the particular properties which make it suitable for the SMC application. In particular, the cut strand must keep its integrity during the maturation of the SMC. Thus, French Pat. No. 2,110,469 describes a sizing composition comprising in particular a modified epoxy resin, an emulsion of a copolymer of vinyl acetate and N-methylolacrylamide, and an emulsion of a copolymer of vinyl acetate and ethylene. This sizing composition gives the glass fiber certain properties already cited which make it suitable for the SMC application, in particular, a fairly good flow capability sufficient for the manufacture of small pieces. On the other hand, the fibers in accordance with this disclosure remain visible in the molded article. Furthermore, the flow capability is not sufficient for the manufacture of large pieces, owing to poor distribution of the reinforcement in the composite, hence, mechanically weak characteristics.

French patent application 77.23198 discloses a new sizing composition comprising in particular a copolymer with a base of vinyl acetate and acrylic monomers of which at least one has an epoxy function. Such composition produces a very good surface appearance for the manufactured article and a sufficiently regular distribution of the fiber in the article, especially when the article is of a very small size. Nevertheless, when one wants to manufacture articles of significant size, for example, on the order of a meter and longer, the flow of fibers, during the molding, is insufficient.

Sizing compositions recommended for the manufacture of large pieces from SMC are also known and are described, for example, in French Pat. No. 2,012,117 and U.S. Pat. No. 4,038,243. These sizing compositions have an unsaturated polyester resin base. They produce fairly good flow properties for the fiber. On the other hand, they give th strand a yellow coloration which subsists in the product after the molding process giving a poor surface appearance by making the strand extremely visible. This is why certain articles have their surfaces granulated or covered with a layer of paint.

Additionally, French Pat. Nos. 1,218,015 and 2,013,040 (U.S. Pat. No. 3,935,344) disclose sizing compositions for glass fibers utilized for the reinforcement of plastics in general and which have a base of alkyd resin capable of being cured by heating with or without the aid of melamineformaldehyde resin. With this composition, the sized strands do not possess attributes permitting them to flow readily and to reinforce the resin in a homogeneous manner in a large-sized article.

For uses other than the SMC application and even more generally for uses other than sizing of textile fibers, French Pat. No. 2,340,389 discloses a binding material for the reinforcement of webs or layers of glass fibers which themselves serve as binding material in the preparation of semi-finished products of thermoplastic synthetic resin with a polyacrylate base containing hydroxy and/or carboxyl groups and crosslinking agents such as blocked polyisocyanates, epoxy compounds, or products of aminoformaldehyde condensation. This binding material provides good resistance and good dimensional stability for the mats or layers of glass fibers.

The present invention provides an aqueous sizing composition comprising, in different proportions, components related to those of the binder composition of French Pat. No. 2,340,389. This sizing composition, utilized for the covering of continuous glass filaments during their manufacture from molten glass or just after, shows unexpectedly excellent qualities for textile sizing, in particular, excellent filmogeneous qualities. That is to say, that it spreads and distributes itself on the filaments in a very regular way; at the same time it gives great integrity to a strand. Even more, it gives a strand good rigitity or stiffness. In contrast to what one skilled in the art might assume from French patent publication No. 2,340,389, the strands are not inter-connected but isolated and perfectly adapted to the SMC application.

Furthermore, the present application involves the reinforcement by the said strands of thermosetting resins such as polyester resins, which are well-known by those skilled in the art as being very different from the thermoplastic resins described in the French patent publication No. 2,340,389.

SUMMARY OF THE INVENTION

The invention relates to a sizing composition for the coating of continuous glass filaments at the time of their manufacture from molten glass and to the treated glass fibers obtained thereby which are useful for the reinforcement of plastic materials.

The new sizing composition comprises a system consisting essentially of several cross-linkable adhesive agents, in particular, a compound having numerous N-methylol and/or N—$CH_2OR$ functions, R being an alkyl radical, at least one acrylic polymer; and, at least one coupling agent.

The treated glass fibers are especially useful in the reinforcement of Sheet Molding Compound.

DETAILED DESCRIPTION AND PREFERRED EMBODIMENTS

The sizing composition of this invention comprises a system of several cross-linkable adhesive agents, in particular, a compound having numerous N-methylol and/or N—$CH_2OR$ functions, R being an alkyl radical, at least one acrylic polymer, modified or unmodified and with or without N-methylol functions, and at least one coupling agent such as an organo-silane capable of entering into the curing reaction of the adhesive agents.

The sizing composition of the invention produces excellent integrity for the glass strand. The coating obtained is slightly soluble in aromatic solvents, such as benzene or styrene, which are present in large quantites in the thermosetting resins of SMC molding sheets. The integrity of the glass strand is such that it is conserved not only during the winding and cutting operations for example, but also during the maturation of the SMC molding sheets and during the hot molding operation itself. The excellent integrity added to great stiffness and good elasticity gives an excellent flow capability to the strand. The great stiffness of the strand permits it to withstand the stresses of flow during the SMC application while remaining as rectilinear as possible in the resin. Composite plastic-glass fiber articles are thereby obtained having good mechanical properties as well as a good surface appearance.

The invention also concerns the sized fibers and reinforced plastic and articles produced therefrom. The term "fiber" is to be understood in the general sense of the word which embodies: The elementary filaments, the strand formed from several filaments and the roving formed from several strands.

The compound with N-methylol function and/or N—$CH_2OR$ function is a formaldehyde aminoplast resin, with or without ether, (polyoxyalkylation) for example, melamine-formaldehyde, urea-formaldehyde, amido-formaldehyde, or optionally, a phenoplast resin or a mixture of these resins whether copolymerized or not. By preference, a partially etherified melamine-formaldehyde is utilized to produce better results.

The acrylic copolymer can be a base of a single or several types of acrylic monomers, in order to form the final copolymer. As acrylic monomers, there can be utilized, for example, an acrylamide, an acrylonitrile, an alklyacrylate, an acrylic acid, a methacrylic acid or an acrylic ester. The acrylic polymer can also contain N-methylol functions or other functions capable of reacting with N-methylol or N—$CH_2OR$, for example, acid, amino, or amido functions.

Preferably, the sizing composition comprises several polymers with a base of acrylic monomers, each one being able to play a particular role in the sizing. Thus, there can be utilized a highly reactive polymer vis-a-vis the compound with N-methylol and/or N—$CH_2$—OR function, for example, polyacrylamide, along with a second polymer which is less active in the cross-linking reaction of the system of adhesive agents but which is a good filmogen. The filmogen property is the ability to spread and distribute itself on the fiber in a very regular manner. Such a polymer can be, for example, a copolymer with a base of vinyl acetate and N-methylolacrylamide or a copolymer with a base of vinyl acetate and acrylic monomers of which at least one functions as an epoxy such as, for example, a copolymer which is marketed under the brand name DZ 23 by Produits Chimiques Rousselot. The sizing composition can furthermore contain a vinyl polymer or copolymer acting as filmogen, for example, an acetate copolymer of ethylene and vinyl such as the product on the market under the brand name AIRFLEX 400 by SAFIC-ALCAN.

The silane which enters into the sizing composition can be one of the silanes traditionally used in sizings for glass fibers utilized in the reinforcement of plastics, which are well-known by those skilled in the art, and which are capable of reacting with functional N-methylol or N—$CH_2OR$ in such a way that the silane enters into the cross-linking reaction of the adhesive agent. Advantageously, an amino silane is utilized such as, for example, gamma-aminopropyl-triethoxysilane, gamma-aminopropyltrimethoxysilane, N beta-aminoethyl-gamma-aminopropyltrimethyoysilane, ureadosilanes, polyureadosilanes, polyazamidosilanes or mixtures of any of these silanes.

The cross-linking reaction of the system of adhesive agents occurs during the drying of the strands at a temperature on the order of 130° C. In order to facilitate this cross-linking reaction, formaldehyde or other cross-linking agents or catalysts can be added to the sizing composition.

When the sizing composition comprises melamine-formaldehyde, these additives are generally unnecessary, the malamine formaldehyde readily cross-linking at a temperature on the order of 75° C. and upward and at a basic pH (greater than about pH 7.0).

It is preferred that a too rapid cross-linking be avoided so that the cross-linking is not completed before the sizing operation is properly completed. Accordingly, the use of cross-linking agents or catalysts are preferably utilized when the composition comprises few N-methylol functions.

As has already been described, the cross-linking of adhesive agent on the strand makes the coating for the greater part insoluble in aromatic solvents, styrene in particular. This insolubility is favorable for the maintenance of good stiffness and integrity but can play an unfavorable role vis-a vis the glass fiber-plastic material linking by hindering the silane-plastic bond. This is why it is advantageous, when silane enters into the cross-linking reaction with the system of adhesive agents, to add to the sizing composition a compound capable of reacting with the system of adhesive agents, and, furthermore, which furnishes it with reactive sites, for example, through a contribution of double chemical bonds which, during reinforcement, react with the plastic material. By modifying the concentration of this compound in the sizing composition, one can obtain an optimum coupling reaction of glass-resin plastic. As an agent capable of furnishing double bonds, one can utilize, for example, acrylamide, acrylic acid or acrylic ester. By preference, the N-methylolacrylamide monomer which reacts particularly well with the adhesive agent is utilized.

Additionally, the sizing composition can advantageously contain an antistatic agent, for example, magnesium chloride, ammonium chloride or, suitably, lithium chloride which can be utilized in small quantities. The addition of an antistatic agent produces an inertness vis-a-vis static electricity for the glass fiber greatly facilitating the operations executed on the strands, especially the strand chopping. The solid content of the sizing composition is preferably between about 6% and about 15% by weight, and particularly, between about 8% and about 12% by weight.

Unless stated otherwise, "%" means percent by weight based on the total weight of the composition.

A strand is particularly well-suited for the SMC application when it is sized with the following solution:
- 4 to 15% of a solution with about 30% polyacrylamide;
- 1.5 to 6% of a solution with about 70% melamineformaldehyde;
- 4 to 15% of an emulsion with about 50% of a copolymer of vinyl acetate and N-methylolacrylamide;
- 0.01 to 1% of gamma-aminopropyltriethoxysilane,
- 0 to 1% of N-methylolacrylamide monomer; 0 to 1% of lithium chloride;
- remainder of 100% being deionized water.

Other characteristics and advantages of the invention will come from the following description and the particular examples which illustrate the implementation of the invention. The examples are illustrative and are not intended to limit the scope of the invention.

The term "system of cross-linking adhesive agents", as used herein, is intended to encompass any water-born thermoset adhesive for plastic bonding or mixtures of such thermoset adhesive resinous materials. Where reference is made to numerous N-methylol and/or N—CH$_2$OR functions, it is understood to mean amino resin adhesives having a high number of functional groups, that is, amino or N-methylol groups which can react in a known manner to cause cross-linking.

The term "modified acrylic" is intended to mean the known polymer modifications of polymethylmethacrylate, including copolymers with other monomers such as methylacrylate, ethylacrylate, acrylonitrile, and the like.

EXAMPLE 1

A sizing composition is prepared comprising the following components expressed in percentages in relation to the total composition:
- 10% of a polyacrylamide solution
- 4% of a melamine-formaldehyde solution
- 10% of an emulsion of a copolymer of vinyl acetate and N-methylolacrylamide
- 0.3% of gamma-aminopropyltriethoxysilane remainder of 100% being deionized water.

The pH of the solution is 7. The solid content is 10% by weight.

The polyacrylamide is, for example, a polymer in water-alcohol solution with 33% solid content which is marketed under the brand name 6T 98 by SOPROSOIE.

The melamine-formaldehyde is an alkylated melamine-formaldehyde in aqueous solution.

A solution with 70% solid content from a melamine resin is utilized; this solution is marketed under the brand name PROX M3 15 763 by PROTEX.

After adjustment, one can also utilize a solution with 80% solid content from a melamine resin marketed under the brand name CYMEL 481 by AMERICAN CYANAMID.

The copolymer of vinyl acetate and N-methylolacrylamide in emulsion is a polymer of a high molecular weight which comprises approximately 97 vinyl acetate monomers for 3 N-methylolacrylamide monomers and which is marketed under the brand name 125/2828 by NATIONAL RESIN.

The emulsion is 50% non-ionic solid content. The silane used as coupling agent is pure gamma-aminopropyltriethyoxysilane. One can use, for example, the silane which is marketed under the brand name A 1100 by UNION CARBIDE.

In order to prepare the sizing composition, one places in a container the previously indicated quantity of the melamine-formaldehyde solution diluted to half concentration with deionized water and adds thereto the emulsion of the copolymer of vinyl acetate and N-methylolacrylamide, the polyacrylamide solution and then the non-diluted silane. The resulting solution has a pH of 8. At room temperature and at this pH, the melamine-formaldehyde is not self cross-linking, nor does it react with the other components of the composition. The solution can be preserved for several days, the length of time varying in each case depending on the specific ingredients.

In the present example, during the fiberization of a glass of type E, the glass filaments obtained by marble melting of direct melting have a diameter of 10 to 14 microns and are collected in strands of 40 to 80 tex (1 tex = 1 gram per 1000 meters of strand) and the sizing prepared, as described above, is applied by well-known methods. The strand is wound in a continuous manner in order to form cakes which are hot-air dried at 130° C. for a period of 12 hours. During the drying operation, the different coating components forming the system of adhesive agents are cross-linked. The cross-linking is established in particular by the reaction of the N-methylol groups with the elimination of water and formaldehyde depending on the particular case.

The strands of several cakes are next easily wound, without formation of "fuzz", in order to form rovings of which the global diameter can vary, for example, 2400 to 4800 tex.

The strands can equally be collected directly into rovings in the form of balls which are then dried.

The glass strand has approximately 1.5% sizing in relation to the total weight of the sized fiber. The strands are extremely stiff. Their stiffness measured by the method described below has an average value of 180.

In order to measure the stiffness of a strand, a roving 50 centimeters long is taken and lifted by attachment to a point in about the middle. The roving forms an arc and the line between the arc is measured at 60 millimeters below the point of attachment. In this example, the line has an average length of 180 millimeters.

The strand is well-protected. It has a very good integrity, that is to say, a very good cohesion between filaments. Its integrity is 1.05, as measured by the method described below.

In order to measure integrity, the ends of the strands are cut at a length of approximately 50 millimeters and are then stretched randomly on a flat surface, usually of glass. A square grid comprising 16 squares, about 2 centimeters on a side, is placed on the glass. The number of strands per square is on the order of a few units. The strands which are situated in each square are noted. One point is attributed to those strands made of only continuous filaments. Two points are attributed to those strands which have some pieces of filaments, and three points are attributed to those strands entirely made of filament pieces. The measurement of the integrity can hence vary between 1 and 3. The points in each square are added. The total points corresponding to a square is divided by the number of strands in the square. For each of the 16 squares the same procedure is followed. An average statistic of the integrity was 1.05, which is very good.

The strand obtained is white. Its coating is about 20% soluble in benzene under reflux.

The sized glass strands are utilized for the reinforcement of preimpregnated SMC. The different types of known preimpregnates (SMCs) can be reinforced by the sized strand, for example, the SMCs of the white type, grey type, blue type and low shrinkage type. The following non-limitative description refers to the reinforcement of the "low shrinkage" type of SMC.

A "low shrinkage" type SMC is prepared from the following components:

| Components | Number of Parts |
| --- | --- |
| Unsaturated polyester resin | 60 |
| acrylic polymer solution in styrene (shrinkage compensator) | 40 |
| calcium carbonate | 150 |
| inner mold-releasing agent | 3 |
| high temperature catalyst | 1 |
| maturing agent | 2.5 |

One places in a cylindrical container, equipped with an agitator, 60 parts unsaturated polyester resin, for example, a resin marketed under the brand name PARAPLEX P 340 by ROHM & HAAS. 40 parts acrylic polymer solution in styrene are added which act as shrinkage compensator, for example, a resin marketed under the brand name PARPLEX P 701 by ROHM & HAAS. One next adds while mixing tertiary butyl perbenzoate which is a catalyst for high temperatures, for example, the product on the market under the brand name TRIGONOX C by LA CHALONNAISE DES PEROXYDES.

Three parts zinc stearate are next added, which is an inner mold releasing agent. Still while mixing, 150 parts calcium carbonate powder of which the particles have an average diameter of 2.5 millimocron are added, e.g. the product marketed under the brand name MILLICARB by OMYA.

When the mixture is homogenized, magnesium hydroxide, a maturing agent is added, for example, the product on the market under the brand name MARINCO H 142 by MERCK CHEMICALS. The mixture is then brought to a temperature of about 32° C. by mixing. A paste is obtained which is spread on a polyethylene sheet with the aid of a scraper on an SMC machine.

The glass roving prepared as described in the preceeding example, is cut in order to form fibers approximately 50 millimeters long, with the aid of a FINN-FRAM chopper placed above the SMC machine. Of course, the rovings can be cut to different dimensions, for example, 25 millimeters. The cut strands are spread on the primary layer of the resin. One thus forms a mat of fibers of which the thickness is about 60 millimeters. Next a second layer of resin is spread and covered with a second thin polyethylene sheet. The glass fiber represents about 30% by total weight of the composite.

The composite passes between rollers which force the resin to penetrate between the glass fibers and reduces the thickness of the composite by several millimeters. Then it is wound in order to form a roll able to be manipulated thanks to the exterior sheets of polyethylene. The roll is left to mature at room temperature during a period of up to several days.

At the end of this period, the SMC is ready for use. A flan comprising about 60% of the surface of the finished molded object is cut from the sheet of SMC. The two sheets of polyethylene protection are withdrawn and the flan is placed in a mold. According to the thickness of the article, several flans can be superimposed. The article is molded in a press at a temperature on the order of 150° C. and under pressure on the order of 50 bars. The pressing operation lasts about one minute per millimeter of thickness.

Troughs of approximately parallelapipedic shape are thus molded, 500 millimeters long × 300 mm wide × 200 mm high and being 4 millimeters thick. These troughs present a very good mechanical resistance.

In this example, just as in the following examples, the qualities of the sized strand were evaluated, in a relative manner, with respect to its function in the following three aspects:

the flow capability of the strand which is evidenced by the homogeneous distribution of the strand in the molded product, the flatness of the surface, noting also the presence of any defects such as pinholes, craters or flow waves, the absence of visibility of the strand.

Five is given when the result is extremely good and one to the contrary when it is extrememly poor. 2+, for example, is given when the result is worth more than 2 but remains inferior to 3. The strand of Example 1 obtains a 5 for the flow, 4 for the flatness of surface, and 4 for the invisibility of the strand. In fact, the strand is only slightly visible in the plastic material and it is uniformly distributed. The strand appears in the form of filaments or rods which shows that it kept its integrity and stiffness during the maturation of the SMC as well as during the molding operation.

EXAMPLE 2

A sized glass strand is manufactured according to Example 1 utilizing the same sizing composition with the exception that the silane is in the form of a hydrolysate. Accordingly, the water is adjusted to a pH of 4 by the addition of acetic acid. The silane is slowly added and the pH is readjusted to 4. The sizing composition obtained has a pH of about 4.5. It is barely stable and must be utilized fairly soon after its preparation. The solid content of the composition is 10%. The coated strand has 1.7% sizing, it is white and presents an average stiffness of 175 and an average integrity of 1.07. The solubility of the sizing in benzene is about 22%. Utilized for the reinforcement of preimpregnated SMCs, it furnishes a homogeneously reinforced molded product with good appearance, the observed properties being as follows: 5 for the flow, 4 for the surface flatness, 4 for the invisibility of the strand.

EXAMPLE 3

A sized glass strand is manufactured according to Example 1, utilizing the same sizing composition with the exception that 0.3% by weight of lithium chloride is also added to this composition, which acts as an antistatic agent. The lithium chloride is added in the form of a 6% aqueous solution, after the other components have been mixed. The solid content of the composition is 10.3% by weight. The coated strand has 1.6% sizing, it is white and presents an average stiffness of 175. Absolutely no filaments are visible, its integrity being 1. It is totally insensitive to static electricity, which is particularly interesting because this facilitates the operations that it subsequently undergoes, such as the chopping. Furthermore, the absence of static electricity is particularly favorable to the formation of a regular, flat mat, which is substantially free of hazardous oriented strands. In this example, the mat of fibers is only about 35 millimeters thick during the manufacture of the preimpregnated SMC. Utilized for the reinforcement of preimpregnated SMCs, it furnishes a molded product, homogeneously reinforced, and with a good appearance. The observed properties are as follows: 5 for the flow, 4 for the surface flatness, 4 for the invisibility of the strand.

EXAMPLES 4 and 5

A sized glass strand is manufactured according to Example 1, except that the proportions of different components in the composition are modified, as follows:

| Example 4 | Example 5 |
| --- | --- |
| 12% | 6% by weight of the polyacrylamide solution |
| 4% | 2% by weight of melamine-formaldehyde |
| 6% | 13% by weight of the emulsion of copolymer of vinyl acetate and N-methylolacrylamide |
| 0.3% | 0.3% by weight of gamma-aminopropyltriethoxysilane |

The solid contents of the compositions are 9% and 8.8% respectively by weight.

The coated strands have 1.25% and 1.60% respectively by weight of sizing. They have an average stiffness of 180 and 175 while their average integrity is 1.10 and 1.07. They are white. The sizings are 15% and 30% respectively soluble in benzene.

Example 4 shows that an excess of polyacrylamide produces a greater stiffness for the strand. This result can be explained by a high degree of cross-linking of the system of adhesive agents. The cross-linking can be proven by greater insolubility than when the composition contains less polyacrylamide. Example 5 seems to show that the copolymer of vinyl acetate and N-methylolacrylamide hardly enters into the cross-linking reaction. On the other hand, this compound, taken in a large quantity, gives a better integrity for the strand, undoubtedly due to the filmogeneous qualities of the said compound.

The two strands are perfectly usable for the reinforcement of preimpregnated SMCs. They give homogeneously reinforced articles which present a good surface appearance. The observed properties in the two cases are as follows: 5 and 4+ for the flow, 4 and 3+ for the surface flatness, 4 for the invisibility of the strand in both cases.

EXAMPLE 6

A sized strand is manufactured, according to Example 1, utilizing the sizing composition of Example 3 in which the copolymer of vinyl acetate and N-methylolacrylamide is replaced in the same proportions by an acetate copolymer of vinyl ethylene, for example, a product on the market under the brand name AIRFLEX 400 by SAFIC-ALCAN utilized as a filmogene. The solid content of the composition is 10.3% weight.

The coated strand is white and has 1.50% by weight of sizing. It has an average stiffness of 175 and an average integrity of 1.05. The sizing is approximately 20% soluble in benzene. The behavior of the strand is reinforcement of preimpregnated SMCs is very close to that of Example 3. The results are 5 for the flow, 4 for the surface flatness and 4 for the invisibility of the strand.

EXAMPLE 7

A sized glass strand is manufactured, according to Example 1, utilizing the following sizing composition:
   7% aqueous solution with about 50% of a copolymer with a base of ethylacrylate, acrylonitrile, acrylic acid,
   4% melamine-formaldehyde solution,
   9% emulsion of a copolymer of vinyl acetate and N-methylolacrylamide,
   0.3% gamma-aminopropyltriethoxysilane,
   remainder of 100% being deionized water.

The solid content of the composition is 11.3% by weight.

In this composition the polyacrylamide is replaced by a copolymer with a base of ethyl acrylate, acrylonitrile, acrylic acid, the monomers being taken in the following proportions: 22% acrylic acid, 16% acrylonitrile and 62% ethyl acrylate.

The white coated strand has 1.35% by weight of sizing. It has a slightly low average stiffness of 161 and an average integrity of 1.07. The sizing is approximately 26% soluble in benzene, which is slightly superior to the solubility of the sizing used in Example 1. However, this does not affect the qualities of the strand too much. Utilized in preimpregnated SMCs, it gives a beautiful surface appearance. The observed properties are as follows: 4+ for the flow, 4 for the surface flatness and 4 for the invisibility of the strand.

EXAMPLE 8

A sized glass strand is manufactured according to Example 1, utilizing the following sizing composition:
   10% aqueous solution having about 33% of a copolymer with a base of ethyl acrylate, acrylonitrile, acrylic acid, 4% melamine formaldehyde,
10% emulsion of vinyl acetate copolymer and N-methylolacrylamide,
0.3% gamma-aminopropyltriethoxysilane,
0.3% lithium chloride,
remainder of 100% being deionized water.

The solid content of the composition is 11.6% by weight.

In this composition, the polyacrylamide is replaced by a copolymer with a base of ethyl acrylate, acrylonitrile, acrylic acid, the monomers being taken in the following proportions: 22% acrylic acid, 16% acrylonitrile and 62% ethyl acrylate, for example, the product marketed under the brand name 8T 93 by SOPROSOIE.

The white coated strand has 1.45% by weight of sizing. It has an average stiffness of 165 and an average integrity of 1.07. The sizing is approximately 25% soluble in benzene.

The observed properties are as follows: 5 for the flow, 4 for the surface flatness and 4 for the invisibility of the strand.

EXAMPLE 9

A sized glass strand is manufactured according to Example 1, utilizing the following sizing composition:
 2.2% solution having about 75% melamineformaldehyde,
 13% emulsion of a copolymer of vinyl acetate and N-methylolacrylamide,
 4% gamma-aminopropyltriethoxysilane,
 3% lithium chloride,
 remainder of 100% being deionized water.

The solid content of the composition is 9.5% by weight.

The etherified melamine-formaldehyde is, for example, the product on the market under the brand name M 5 75 by PROTEX.

The coated strand has 1% by weight of sizing. It has a slightly low stiffness of 165. Its average integrity of 1.30 is fairly poor. The sizing is about 45% soluble in benzene, which is superior to the solubility of the sizing used in Example 3. These differences have an unfavorable influence on the flow aptitude of the strand which produces an article reinforced less homogeneously than the preceding examples. The observed results are as follows: 4 for the flow, 3+ for the surface flatness and 4 for the invisibility of the strand.

EXAMPLE 10

A sized glass strand is manufactured, according to Example 1, utilizing the sizing composition of Example 9 in which 0.8% by weight of a butylcarbitol acetate is added, for example, the product marketed under this brand name by UNION CARBIDE. The solid content of the composition is 10.3% by weight. The coated strand has 1.35% by weight of sizing. The addition of the butylcarbitol acetate has little influence on the stiffness which is 165, but it improves the integrity of the strand which is 1.1. The sizing is about 36% soluble in benzene. Utilized in the reinforcement of preimpregnated SMCs, the strand gives better results than those of Example 8, but remains inferior to those of other preceding examples. The observed properties are as follows: 4 for the flow, 3+ for the surface flatness and 4 for the invisibility of the strand.

EXAMPLE 11

In this example, the strand is manufactured according to Example 1, utilizing the sizing of Example 3 to which one adds 0.2% by weight of the N-methylolacrylamide monomer. The solid content of the composition is 10.5% by weight.

This addition does not influence either the stiffness and integrity qualities of the strand or the solubility of the sizing in benzene. The use of the sized strand in the reinforcement of preimpregnated SMCs can produce improved mechanical properties for the molded product. This improvement can be explained by a better glass matrix plastic bonding due to the reactive sites, in particular to the double chemical bonds brought to the adhesive system by the N-methylolacrylamide monomer.

EXAMPLE 12

A sized strand is prepared according to Example 1, utilizing a known sizing composition, which is described in French Pat. No. 2,012,117, as follows:
 8.4% unsaturated polyester resin, 1 mole of phthalic resin 1 mole of maleic anhydride 2 moles of glycol propylene, baked until an acid index of 30 to 35 is reached
 3.6% solvent,
 1.09% emulsifying agent "Pluronic F 77"*,
 0.50% gamma-methacryloxypropyltrimethyoxysilane,
 0.04% glacial acetic acid in order to adjust the pH,
 0.126% cationic lubricant, "AHCO 185 AE"**
 0.054% of a second cationic lubricant, "AHCO 185 AN"***,
 0.70% saturated polyester resin 1 mole of phthalic anhydride 1 mole of succinic anhydride 2.3 moles of glycol propylene baked until an acid index of 35 to 40 is reached,
 remainder of 100% being deionized water.

The dry extract of the composition is 11% by weight.
(*) "Pluronic F 77" is a registered trademark of the WYANDOTTE CHEMICAL CORP. for a condensation product of ethylene glycol and a hydrophobe base formed while condensing propylene hydroxide with propylene glycol.
(**) "AHCO 185 AE" is a registered trademark of the Arnold Hoffman Co. for the reaction product of tetraethylenepentamine and pelargonic acid, and rendered soluble with acetic acid.
(***) "AHCO 185 AN" is a registered trademark of the Arnold Hoffman Co. for the reaction product of tetraethylenepentamine and caprylic acid rendered soluble with acetic acid.

The coated strand has 2% by weight of sizing. Its average stiffness is 170 and its average integrity is 1.20. The sizing is about 20% soluble in benzene. The strand obtained is yellow and very sensitive to static electricity. Utilized in the reinforcement of preimpregnated SMCs, the strand remains extremely visible in the molded product owing to its yellow color. Moreover, the poor integrity is not favorable to a good flow, certain strands losing their rod-like structure.

The observed properties are as follows: 4 for the flow, 4 for the surface flatness, 2+ for the invisibility of the strand.

EXAMPLE 13

The sized strand is manufactured according to Example 1, utilizing a sizing composition described in U.S. Pat. No. 4,038,243, generally used in SMC application for large pieces. This composition comprises an adhesive agent similar to the one in Example 11, with a base of an unsaturated polyester and a saturated polyester.

The solid content of the composition is 10.5% by weight.

The sized strand has 1.50% by weight of sizing. Its average stiffness of 140 is very low. Its integrity has a value of 1.15 which is fairly average. The sizing is about 15% soluble in styrene. As in Example 12, the strand is easily loaded with static electricity. Utilized for the reinforcement of preimpregnated SMCs, the strand produces articles less mechanically resistant than those obtained in Examples 1 to 11. This difference in the mechanical properties is explained by a poor distribution of the strand in the plastic material due to the poor flow capability of the strands, which, during the molding operation, forms undulations, curls and loops. The observed results are as follows: 3+ for the flow, 4 for the surface flatness, and 2+ for the invisibility of the strand.

The good results obtained with the composition of the invention are further shown by the following table which combines the results of the different examples:

| STRAND PREPARED IN EXAMPLE NUMBER | ACCORDING TO THE INVENTION | | | | | | | | | | | STATE OF THE ART | |
|---|---|---|---|---|---|---|---|---|---|---|---|---|---|
| | 1 | 2 | 3 | 4 | 5 | 6 | 7 | 8 | 9 | 10 | 11 | 12 | 13 |
| FLOW CAPABILITY | 5 | 5 | 5 | 5 | 4+ | 5 | 4+ | 5 | 4 | 4 | 5 | 4 | 3+ |
| SURFACE FLATNESS | 4 | 4 | 4 | 4 | 3+ | 4 | 4 | 4 | 3+ | 3+ | 4 | 4 | 4 |
| VISIBILITY OF THE STRAND | 4 | 4 | 4 | 4 | 4 | 4 | 4 | 4 | 4 | 4 | 4 | 2+ | 2+ |

The articles obtained from preimpregnates (SMCs) reinforced with glass fiber prepared according to Examples 1 to 11, present a good surface appearance with a good surface flatness and a very slight visibility of the strands. Among these strands, those sized from compositions containing slightly etherified melamine-formaldehyde are markedly superior in their flow capability.

The presence of an antistatic agent in the sizing composition produces strands insensitive to static electricity, which greatly facilitates certain operations carried out on the strand, such as the chopping which can hence be executed without difficulties and without ionizing the atmosphere by the use of antistatic metallic bars. This is why, in its preferred form, the sizing composition of the invention contains an antistatic agent which is by preference lithium chloride.

More generally speaking, the industrial realization of the invention is relatively easily accomplished. For example, at no time was "fuzzing" observed. Despite its great stiffness, the strand of the invention can form flat mats or slightly raised mats, particularly during the preparation of the preimpregnated SMCs.

The sized strands of the invention can equally be incorporated into preimpregnates (SMCs) in the shape of rolls which, as well as the SMC sheets, are utilized for the manufacture of molded pieces. Such rolls are also known as PREMIX "BULK MOLDING COMPOUND" or "DOUGH MOLDING COMPOUND".

The good appearance of the molded articles permits their marketing as raw moldings without the need for a granulated or painted surface.

We claim:

1. In a method of manufacturing coated glass fiber comprising the following operations in sequence:
   (a) mechanically drawing filaments of molten glass at high speed
   (b) coating said filaments with an aqueous sizing composition
   (c) collecting said coated glass filaments during the drawing operation in the form of strands which are wound into cakes, dried and then collected into roving slivers in the shape of a ball, or directly collected into ball-shaped rovings and dried;

the improvement which comprises coating the filaments with an aqueous sizing composition comprising a system of cross-linking adhesive agents consisting essentially of at least one compound having a number of functional groups which are N-methylol functions or N-CH$_2$OR functions or both, with R being an alkyl radical, at least one acrylic polymer which may be modified or unmodified, and an amino-alkoxy-silane.

2. The method of claim 1 wherein the ingredients in said aqueous sizing composition consist essentially of:
   polyacrylamide in an amount equivalent to 4 to 15% by weight of a 30% polyacrylamide solution,
   melamine-formaldehyde in an amount equivalent to 1.5 to 6% by weight of a 70% melamine-formaldehyde solution,
   a copolymer of vinyl acetate and N-methylolacrylamide in an amount equivalent to 4 to 15% by weight of an emulsion of 50% of said copolymer,
   0.01 to 1% by weight of Gamma aminopropyltriethoxysilane,
   0 to 1% by weight of N-methylolacrylamide, monomer, and
   0 to 1% by weight of lithium chloride.

3. The method of claim 1 wherein the ingredients in said aqueous sizing composition consist essentially of:
   4% by weight of an aqueous solution of melamine formaldehyde (70% solids),
   10% by weight of an emulsion (50% solids) of a copolymer prepared from vinyl acetate (97 parts) and N-methylolacrylamide (3 parts),
   10% by weight of an aqueous solution containing 33% of a copolymer prepared from 22% acrylic acid, 16% acrylonitrile and 62% ethylacrylate,
   0.3% by weight of Gamma-aminopropyltriethoxysilane, and
   0.3% by weight of lithium chloride.

4. The method of claim 1 wherein the ingredients in said aqueous sizing composition consist essentially of:
   polyacrylamide in an amount equivalent to 4 to 15% by weight of a 30% polyacrylamide solution,
   melamine-formaldehyde in an amount equivalent to 1.5 to 6% by weight of a 70% melamine formaldehyde solution, a copolymer of vinyl acetate and N-methylolacrylamide in an amount equivalent to 4 to 15% by weight of an emulsion of 50% of said copolymer,
0.01 to 1% by weight of Gamma aminopropyltriethoxysilane,
0 to 1% by weight of N-methylolacrylamide, monomer, and
0 to 1% by weight of lithium chloride, and contains free formaldehyde and crystallizable acetic acid.

* * * * *